June 27, 1967     J. W. HOLDEMAN     3,327,558
DIFFERENTIAL MECHANISM
Filed July 29, 1965
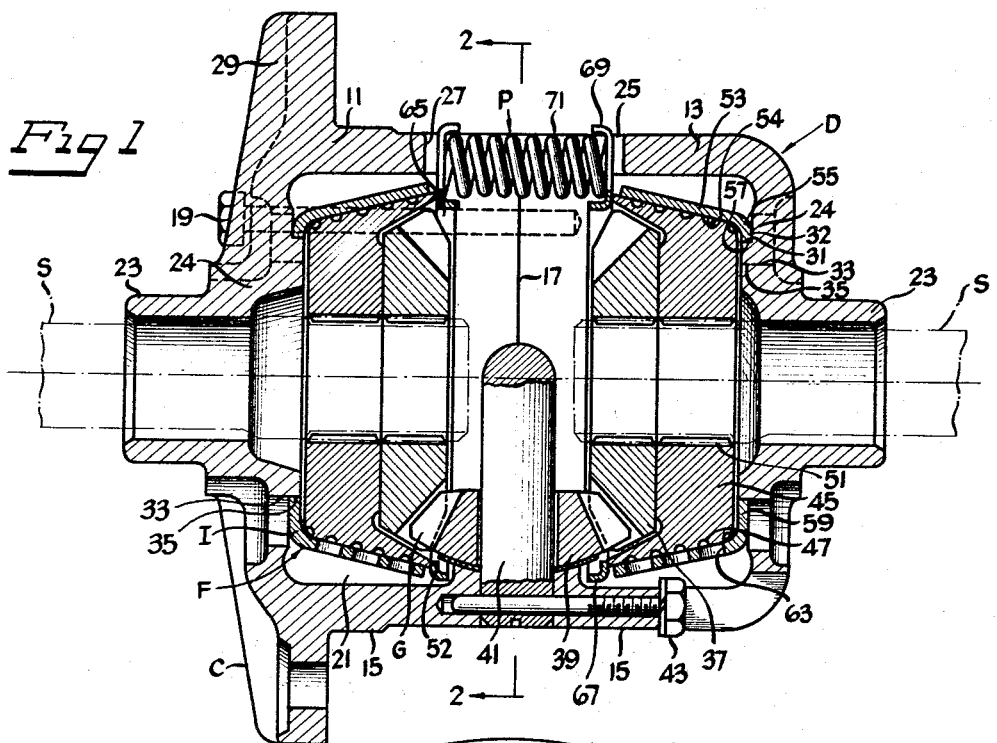
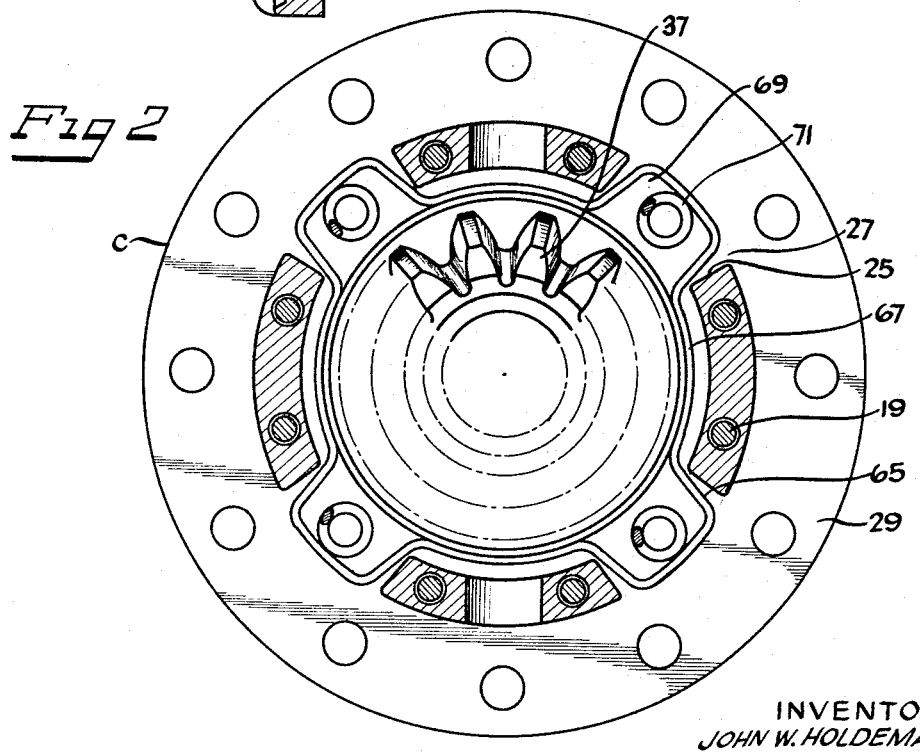
INVENTOR
JOHN W. HOLDEMAN

United States Patent Office 3,327,558
Patented June 27, 1967

3,327,558
DIFFERENTIAL MECHANISM
John W. Holdeman, Auburn, Ind., assignor to Borg-Warner Corporation, Chicago, Ill., a corporation of Illinois
Filed July 29, 1965, Ser. No. 475,809
6 Claims. (Cl. 74—711)

This invention relates to limited slip differential mechanisms which provide a predetermined resistance to differential action. More particularly, it relates to limited slip differential mechanisms which utilize conically shaped clutch members to provide the resistance to free differentiation.

It is the principal object of the present invention to provide an improved form of limited slip differential mechanism utilizing a conically shaped clutch to resist differentiation.

It is another object of the present invention to provide an improved form of limited slip differential mechanism of the type described wherein separate removable inserts form the conically shaped cone seat surfaces and wherein the initial preload of the clutch members is provided independent the side gears of the mechanism.

These and other objects of the present invention will become apparent with reference to the following description and the accompanying drawings.

In the drawings:

FIGURE 1 is a revolved cross-sectional elevational view of a differential mechanism constructed in accordance with the present invention showing various of the features thereof;

FIGURE 2 is a sectional view of the apparatus of FIGURE 1 taken substantially along the line 2—2 of FIGURE 1.

Very generally, the present invention is directed to an improved form of limited-slip differential mechanism utilizing conically shaped clutch members to resist differential action wherein an initial preload upon the clutches is provided independent the bevel gear system of the mechanism.

Referring now to the drawings, there is shown a differential mechanism generally designated D disposed in operative association with a pair of coaxially aligned relatively rotatable output shafts S. These shafts may form the driving axle of an automotive vehicle, or any other device which requires distribution of torque to two utilization points where relative movement between shafts is necessary under certain operating conditions.

The mechanism D includes a casing C surrounding adjacent ends of the output shafts S which casing is adapted to receive input torque from a drive line system (not shown). A bevel gear system generally designated G is connected between the casing C and the shafts S and transmits rotational effort to the shafts while simultaneously allowing relative rotation between them when required, as when an automotive vehicle negotiates a corner.

A pair of friction clutches F provides the desired resistance to differential action. Each clutch includes a friction surface associated with the casing C and a friction surface associated with one of the output shafts S. Frictional engagement of these surfaces provides a direct path for transmission of rotational effort from the casing to the output shafts independent the bevel gear system G. It should be appreciated that one such clutch associated with one of the output shafts S could be used.

The friction surfaces of the clutch F are maintained in engagement by a spring pack P which is independent the bevel gear system G and which provides an initial preload directly upon the clutch members.

Each of the clutches F includes a removable insert I which is connected to the casing C for rotation therewith and which forms the friction surface of the clutch F associated with the casing C.

The casing C is formed by a pair of cooperating, generally cup-shaped sections comprising a flange section 11 and a cap section 13 which include generally cylindrical wall portions 15 disposed in abutting relation along a parting line 17. These sections are retained in abutting relation as by bolts 19 with the exterior surface of the walls defining a portion of the exterior of the casing and interior surface of the walls defining a cavity 21 surrounding the adjacent ends of the output shafts S.

Each of the sections 11 and 13 include a shaft opening defined by a longitudinally elongated hub 23 centrally disposed in a transverse wall 24 of that section which receive the shafts S. The shafts are not journalled within the hubs, but rather the hubs support bearings (not shown) which position the mechanism D within the axle assembly.

A plurality of side port openings 25 are provided which are formed by mating rectangular openings in each of the casing section at their abutting ends. These side port openings allow lubricant to enter the casing for lubrication of the bevel gear system G and the clutches F and serve other purposes as will be explained shortly. Each of the openings in the respective casing halves includes a wall 27. These walls define the width of the side port in the longitudinal direction.

The number of side port openings used is optional. In the illustrated embodiment, four such side ports are provided (FIGURE 2). Though one could be used, a minimum of two should, however, be provided. It is preferred that they be equally spaced about the casing.

The flange section 11 of the casing C includes a radially directed flange 29 extending about its exterior periphery to which is secured a ring gear (not shown) adapted to receive an input torque from the drive line system.

The interior surface of each of the transverse walls 24 is provided with a generally cylindrical pilot surface or shoulder 31 disposed coaxially of the longitudinal axis of the shafts S and the hubs 23. The side walls 24 extend radially outwardly from the shoulders 31 to form axial stop surfaces 32. The shoulders 31 and axial stop surfaces 32 act to position the inserts I within the cavity 21 as will be explained.

A plurality of longitudinally directed end ports 33 in the form of drilled holes are provided in each transverse wall and are spaced about a base circle having a diameter larger than the diameter of the cylindrical shoulder 31, but smaller than the sum of the diameter of the shoulder plus the diameter of the end port hole 33. Thus, the end port holes intersect the shoulder 31 to form a series of inwardly directed notches 35 of generally semi-circular cross-section.

Referring now to the bevel gear system G, best seen in FIGURE 1, there is provided an arrangement which transmits output torque to the shafts S and simultaneously allows relative rotation between shafts when necessary.

The bevel gear system includes a pair of side gears 37, each of which is connected to one of the shafts S for rotational movement therewith and axial movement thereon. To effect this relationship between the shafts and side gears, the adjacent ends of the shafts S and the internal bore of the gears are splined.

The side gears are in constant mesh with a pair of pinion gears 39 supported by a transversely extending pinion pin 41 disposed intermediate the adjacent ends of the shaft S and secured to the casing C for rotation therewith by retainer pin 43.

As can be appreciated, rotation of the differential casing C by the drive line system causes the pinion pin 41 to revolve about the centerline of the shafts S. The pinion gears 39, therefore, transcribe a generally cylindrical path about the axis of the shafts, and as they are in mesh with the side gears 37, the side gears are caused to rotate and thereby transmit torsional effort to the output shafts S.

If one of the output shafts is required to rotate at a different speed than the other, as when cornering, the pinion gears 39 not only revolve about the longitudinal axis of the output shafts, but also rotate about the pinion pin 41 allowing relative movement between the side gears 37. Consequently, the output shafts S rotate relative to each other as well as relative to the casing C.

Differentiation, i.e., relative rotation between the shafts, inherently possible by virtue of the above described structure, is resisted by the engagement of the friction surfaces of the clutches F. Each of these clutches includes a frusto-conical clutch member 45 and one of the cone seat inserts I frictionally engaged by the member 45 along a complementary conical surface.

A spirally progressing groove 47 is provided in the conical surface of the clutch members 45 for distribution of oil or other lubricant to the frictionally engaged surfaces.

Each clutch member 45 includes an internally splined bore 51 connected to one of the shafts S and is, therefore, rotatable with the shaft and axially movable thereon.

Each of the clutch members 45 is disposed between one of the transverse walls 24 of the casing C and one of the side gears 37 and includes a generally radially directed annular face 52 adjacent the divergent end of the conical members.

The respective annular faces 52 of each of the clutch members 45 are disposed in spaced apart facing relation on opposite sides of the pinion pin 41. They are disposed axially inwardly of the divergent ends of the inserts and the distance between them, when the clutch members are in contact with the inserts, is less than the longitudinal width of the side ports 25 for reasons as will be explained.

As stated, and as best seen in FIGURE 1, the conical drum or seat surfaces frictionally engaged by the clutch members 45 are provided by the removable cone seat inserts I which form the friction surfaces of the clutches F associated with the casing C.

These inserts include a generally conically shaped wall portion 53, the interior of which includes a conical seat surface 54 engaged by the clutch members 45. The inserts I may be formed of any suitable material such as, for example, steel, and may be made by any one of several manufacturing processes such as stamping, turning, spinning, grinding, etc.

The convergent end of the conical wall 53 of each insert is provided with an inwardly directed radial flange 55 terminating in a generally cylindrical pilot surface 57 having a diameter approximately equal to the diameter of the pilot shoulder 31 of the casing C. The insert is disposed within the differential casing with the pilot surface 57 overlying the shoulder 31 formed on the casing wall 24 to effect radial location of the insert with respect to the output shafts S and accordingly with respect to the clutch members 45.

Further, the outer surface of the radial flange 55 of each insert is disposed in contact with one of the axial stop surfaces 32 to axially position the inserts I with respect to the casing C and the clutch members 45. These stop surfaces fix the position of the inserts in relation to the clutch members and support them in opposition to the axial forces applied by the spring pack P to effect frictional engagement between the surfaces 54 and the clutch members 45.

A plurality of radially directed tabs 59 extending inwardly of the pilot diameter 57 are provided which are sized and spaced apart so as to be retained within the drive notches 35 formed by the intersection of the end ports 33 and the shoulder 31. A driving relationship between the inserts I and the casing C is thus established enabling the transmission of rotational effort from the casing C to the clutch member 45 through the frictional engagement of the clutch members 45 with the conical seat surfaces 54.

The particular arrangement for positioning and driving the inserts I shown in the embodiment of the invention described must, of course, be considered as merely illustrative, as numerous variations could be provided without departing in any way from the scope of the invention.

Each insert I is provided with a plurality of lubricating orifices 63 to supply lubricant to the spirally progressing groove 47 of the clutch member 45. These orifices are disposed longitudinally along the insert conical wall 53 in one or more rows as desired. Lubricant within the cavity 21 of the casing C may pass through these orifices into communication with the spiral grooves 47 for distribution to the frictionally engaged surfaces.

Application of axial force upon the clutch members 45 is accomplished in two ways; first, initial frictional engagement of the clutch members 45 with the drum or seat surfaces of the inserts I is provided by the spring pack P independently of the side gears 37.

Secondly, frictional engagement is increased generally as a function of the torsional input to the mechanism casing C by the bevel gear system G.

Application of torque to the mechanism creates axial separating forces upon the side gears 37 which forces are, in turn, transferred to the clutch members 35 to provide a cumulative increased frictional engagement of the clutches to resist differential action.

The spring pack P which provides the above described initial preload upon the clutch members is disposed within the cavity 21 in generally surrounding relation to the pinion pin 41.

The spring pack P includes a pair of clutch contacting members 65 each of which includes a generally annular contacting ring 67 in radial contact with one of the faces 52 of one of the clutch members 45. The contacting members further include upstanding spring reaction tabs 69, one of which is disposed in each of the spring port openings 25 in spaced apart facing relation to the corresponding tab of the other contacting member. These tabs are spaced inwardly of the walls 27 of the side port openings so that they are free to move axially outwardly.

A compressed coil spring, such as the spring 71 is disposed between each of the pairs of tabs disposed in each side port opening. The springs apply an axial separating force upon the tabs 69 which is transmitted from the tabs to the clutch members 45 through the annular contacting rings 67, effecting frictional engagement of the clutch members with the conical surfaces 54 of the inserts I. This engagement provides an initial preload upon the clutch members independent the side gear which provides an initial resistance to differentiation.

As stated, four side ports 25 are provided in the illustrated embodiment. Therefore, each clutch contacting member of the spring pack includes four upstanding spring reaction tabs 69 and four springs 71, one for each side port opening.

It is, of course, obvious that the number of side ports and springs could be varied as desired without departing from the scope of the invention. The side ports and springs are preferably disposed generally symmetrically about the periphery of the casing to provide uniform loading of the clutch members, and it is preferred that at least two such ports and springs be provided although only one could be used.

As can be seen, a differential mechanism has been provided which utilizes cone seat inserts to form the conical clutch surfaces associated with the mechanism casing. Further, initial preload of the clutch member is provided independent the bevel gear system utilized to transmit rotational effort to the output shafts.

Various of the features of the invention have been particularly shown and described, however, it should be obvious to one skilled in the art that various modifications may be made therein without departing from the scope of the invention.

What is claimed is:

1. A limited slip differential mechanism comprising: a differential casing adapted to receive an input torque for transmission to a pair of coaxially aligned relatively rotatable output shafts; at least one removable insert disposed internally of said casing and secured thereto for rotation therewith, said insert defining a conical seat surface; at least one conical clutch member disposed within said casing adapted to frictionally engage said conical surface and adapted to be connected to one of the output shafts; a bevel gear system including at least one pinion gear and at least one side gear within said casing adapted to be operatively connected to the output shafts for transmission of rotational effort thereto; and means independent said bevel gear system disposed in contact with said clutch member urging said clutch member into an initial predetermined frictional engagement with said conical surface of said insert, said bevel gear system being adapted to apply an axial force upon said clutch member in a direction to increase said frictional engagement.

2. A limited slip differential mechanism comprising: a differential casing adapted to receive an input torque for transmission to a pair of coaxially aligned relatively rotatable output shafts; at least one removable insert disposed internally of said casing and secured thereto for rotation therewith, said insert defining a conical seat surface; at least one conical clutch member disposed within said casing adapted to frictionally engage said conical surface and adapted to be connected to one of the output shafts, said conical clutch member including a generally radially directed annular face adjacent its divergent end; a bevel gear system including at least one pinion gear and at least one side gear within said casing adapted to be operatively connected to the output shafts for transmission of rotational effort thereto; and means independent said bevel gear system urging said clutch member into an initial predetermined frictional engagement with said conical surface of said insert, said means including at least one clutch contacting member having a generally annular contacting surface disposed in contact with said face of said clutch member, said bevel gear system being adapted to apply an axial force upon said clutch member in a direction to increase said frictional engagement.

3. A limited slip differential mechanism comprising: a differential casing adapted to receive an input torque for transmission to a pair of coaxially aligned relatively rotatable output shafts, said casing including at least two longitudinally extending port openings extending through said casing and disposed in circumferentially spaced apart relation with circumferential distances between them being approximately equal; at least one removable insert disposed internally of said casing and secured thereto for rotation therewith, said insert defining a conical seat surface; at least one conical clutch member disposed within said casing adapted to frictionally engage said conical surface and adapted to be connected to one of the output shafts, said conical clutch member including a generally radially directed annular face adjacent its divergent end; a bevel gear system including at least one pinion gear and at least one side gear within said casing adapted to be operatively connected to the output shafts for transmission of rotational effort thereto; and means independent said bevel gear system urging said clutch member into an initial predetermined frictional engagement with said conical surface of said insert, said means including a clutch contacting member having a generally annular contacting surface disposed in contact with said face of said clutch member, and an upstanding spring retention tab disposed in each of said port openings, said means further including a compressed coil spring in each of said port openings in contact with said retention tab and urging said clutch member into said frictional engagement through said tabs and said contacting surface, said bevel gear system being adapted to apply an axial force upon said clutch member in a direction to increase said frictional engagement.

4. A limited slip differential mechanism comprising: a differential casing adapted to receive an input torque for transmission to a pair of coaxially aligned relatively rotatable output shafts; a pair of removable inserts disposed internally of said casing and secured thereto for rotation therewith, said inserts defining a pair of conical seat surfaces disposed in longitudinally spaced apart facing relation with the divergent ends thereof disposed in facing relation; a pair of conical clutch members disposed within said casing each of which is adapted to frictionally engage one of said conical surfaces and further adapted to be connected to one of said output shafts, each of said clutch members including a generally radially directed annular face adjacent its divergent end, said faces being disposed in spaced apart facing relation with the distance between said faces being less than the distance between said divergent ends of said conical seat surfaces; a bevel gear system including at least one pinion gear and at least one side gear within said casing adapted to be operatively connected to the output shafts for transmission of rotational effort thereto; means operative between said clutch members urging said clutch members into an initial predetermined frictional engagement with said conical surfaces of said inserts, said means including a pair of clutch contacting members, each of which has a generally annular contacting surface disposed in contact with one of said faces of one of said clutch members and at least one upstanding spring retention tab extending radially outwardly of each of said annular surfaces, said means further including a compressed coil spring interposed between said upstanding spring retention tabs effective to urge said clutch members into frictional engagement through said clutch member contacting surfaces, said bevel gear system being adapted to apply an axial force upon said clutch member in a direction to increase said frictional engagement.

5. A limited slip differential mechanism comprising: a differential casing adapted to receive an input torque for transmission to a pair of coaxially aligned relatively rotatable output shafts, said casing including a generally cylindrical shoulder and a radially directed axial stop surface adjacent said shoulder; at least one removable insert disposed internally of said casing and secured thereto for rotation therewith, said insert defining a conical seat surface, and including a cylindrical pilot surface overlying said shoulder to radially position said insert with respect to said casing and a generally radially directed surface disposed in contacting relation to said axial stop surface to axially position said insert with respect to said casing; at least one conical clutch member disposed within said casing adapted to frictionally engage said conical surface and adapted to be connected to one of the output shafts; a bevel gear system including at least one pinion gear and at least one side gear within said casing adapted to be operatively connected to the output shafts for transmission of rotational effort thereto; and means independent said bevel gear system in contact with said clutch member urging said clutch member into an initial predetermined frictional engagement with said conical seat surface of said insert, said bevel gear system being adapted to apply an axial force upon said clutch member in a direction to increase said frictional engagement.

6. A limited slip differential mechanism comprising: a differential casing adapted to receive an input torque for transmission to a pair of coaxially aligned relatively rotatable output shafts, said casing including a generally cylindrical shoulder, at least one notch formed in said shoulder extending radially inwardly therefrom and a radially directed axial stop surface adjacent said shoulder; at least one removable insert disposed internally of said casing, said insert defining a conical seat surface, and including a cylindrical pilot surface overlying said shoulder to radially position said insert; at least one drive tab extending radially inwardly of said pilot surface engaging said notch formed in said shoulder to provide a driving engagement between said insert and said casing, and a generally radially directed surface disposed in contacting relation to said axial stop surface to axially position said insert; at least one conical clutch member disposed within said casing adapted to frictionally engage said conical surface and adapted to be connected to one of the output shafts; a bevel gear system including at least one pinion gear and at least one side gear within said casing adapted to be operatively connected to the output shafts for transmission of rotational effort thereto; and means independent said bevel gear system in contact with said clutch member urging said clutch member into an initial predetermined frictional engagement with said conical seat surface of said insert, said bevel gear system being adapted to apply an axial force upon said clutch member in a direction to increase said frictional engagement.

References Cited

UNITED STATES PATENTS 3,186,258    6/1965    Meldola _____ 74—710.5
3,224,299    12/1965    Holdeman et al. _____ 74—711

FOREIGN PATENTS 1,236,945    6/1960    France.

FRED C. MATTERN, JR., *Primary Examiner.*

J. A. WONG, *Assistant Examiner.*